June 27, 1933.            C. PARKER            1,915,614
SOLIDIFIED EDIBLE AND METHOD OF MAKING SAME
Filed Dec. 22, 1930
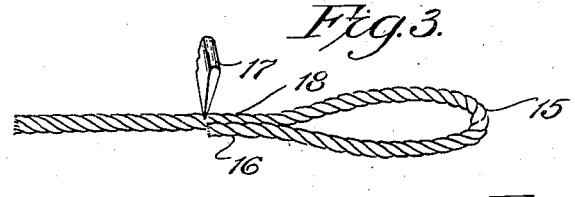
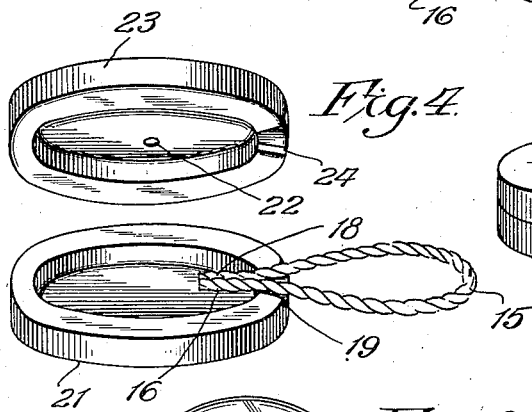
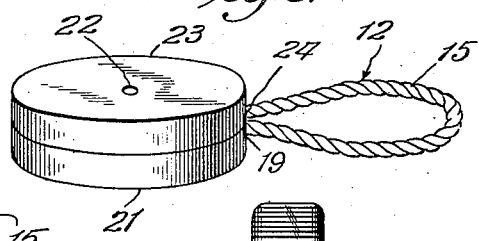
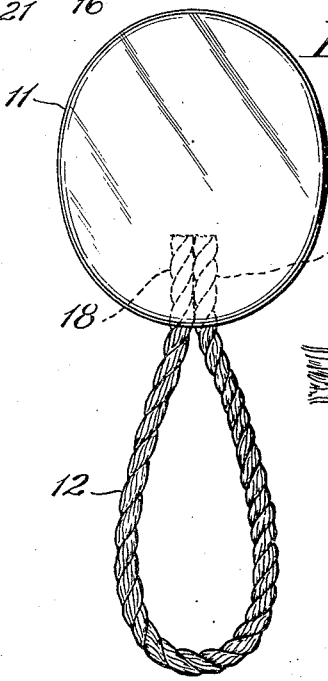
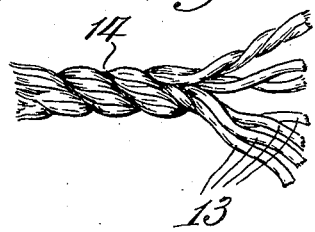
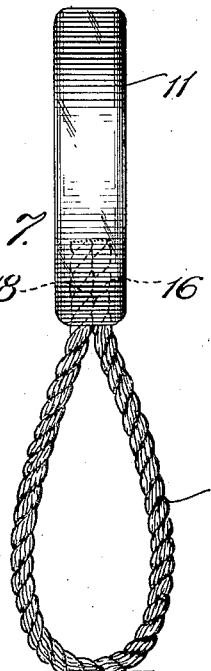
Inventor
Charles Parker Patented June 27, 1933

1,915,614

UNITED STATES PATENT OFFICE

CHARLES PARKER, OF CHICAGO, ILLINOIS

SOLIDIFIED EDIBLE AND METHOD OF MAKING SAME

Application filed December 22, 1930. Serial No. 503,896.

This invention relates in general to edibles and has more particular reference to a novel shaped or solidified edible of the class having handles projecting from the edibles to facilitate the handling thereof, and to a novel method of attaching such edibles to the handle.

A primary object of the present invention is the production and provision of an improved edible of the class having a solidified edible supported by or suspended from a handle member.

An important object of the invention is the provision of a novel handle or suspending member for solidified edibles which is very flexible but which has sufficient strength to provide a support or suspension member for the edibles.

Another important object of the invention is the production and provision of solidified edibles in which the configuration of the handle cooperates with the solidified edible to provide a secure connection therebetween.

A further important object of this invention is the provision of a non-rigid handle which is of such configuration as to securely adhere in or to a solidified edible to prevent or to overcome the ready separation of the handle from the solidified edible as frequently occurs in prior art edibles such as those known as lollipops, suckers or "Popsicles", thereby rendering the solidified edible incapable of hygienic handling.

Still another important object of the invention is the provision of such a handle for solidified edibles which is sufficiently flexible to permit the provision of a looped handle and to the provision of a novel method for attaching such a handle in or to the edibles.

Other objects and advantages of this invention will become apparent from the following specification and the appended claims.

Referring to the drawing,

Fig. 1 is a fragmentary plan view of the novel handle material of the invention.

Fig. 2 is a schematic view illustrative of one of the steps in the novel method of the invention.

Fig. 3 diagrammatically illustrates another step in the novel method of the invention.

Fig. 4 illustrates one form of a molding device suitable for use in forming a complete lollipop.

Fig. 5 shows the molding device of Fig. 4, and the positioning of the handle member during the step of forming the edible in connection with the handle.

Fig. 6 is a plan view of a complete solidified edible embodying some of the features of the invention.

Fig. 7 is an elevation of a solidified edible having the handle so attached as to facilitate the handling of the edible and Fig. 8 is an enlarged fragmentary view of the handle material shown in Fig. 1.

Solidified or shaped edibles of the class of confection known to the trade as lollipops, suckers and frozen ices or ice cream, such as "Popsicles", have hitherto been provided with a relatively rigid handle usually made of wood or of an edible confection. Such edibles are distributed for consumption usually by children who hold the handle while slowly eating the lollipop or "Popsicle". Frequently such edibles are carried in the mouth of the consumer while eating, the handle projecting several inches outside of the mouth, and providing the means of a severe wound in the event that the handle is struck as by the consumer falling while the lollipop is being eaten. The consumer of a lollipop having a wooden handle is, therefore, endangered because the handle may pierce the flesh of the consumer when it is so struck or the handle may be broken and splintered and slivers therefrom may pierce or inflict a severe wound in the mouth or about the features of the one eating the lollipop.

Moreover, such wooden handles are usually of such shape and configuration as to be susceptible to the disadvantage of being pulled out of the edible, thereby destroying the utility of the handle and rendering the lollipop incapable of sanitary handling.

Candy handles or handles made of other confections are objectionable from the standpoint of sanitation when produced for use by children because the small child handles the support member before eating it.

The present invention briefly contemplates overcoming the foregoing defects by providing such edibles with non-splintering and flexible handles of such configuration as to cooperate with the edible to provide a secure connection with the edible.

In order to accomplish the foregoing objects and to overcome the above mentioned objections, I provide, as shown in Fig. 6, a confection 11 of the lollipop class having a handle or support member 12 which is sufficiently flexible to provide a looped handle but which is sufficiently rigid to support the confection 11. As shown in the drawing, this handle 12 may be securely attached in or to the lollipop 11.

As disclosed in my copending application, Serial No. 478,583, filed August 29, 1930, the handle 12 may be constructed of any suitable material which is sufficiently flexible to give or bend under compressive forces and which will not shatter or splinter if broken. I have found that the handle or member 12 should preferably be so constructed as to provide a surface to which the confection 11 will securely adhere when it is solidified in order to prevent the separation of the handle from the confection. Such a material may comprise a strip of fibrous material such as paper twisted to a substantially round cross section. I prefer, however, to construct the handle 12 of a seagrass such as that which is commonly found in the Orient.

A plurality of strands 13 of this seagrass are twisted or plated together as shown more particularly in Fig. 8, to provide a strong and flexible cord or rope-like member 14. This cord or rope-like member 14 is or may be provided in strips of considerable length as shown in Fig. 1, and may be cut to pieces of the desired length and the ends of the strips connected to the confection 11 in a manner which will now be described.

As shown in Fig. 2, the cord or rope-like member 14 may be bent or formed to provide a loop 15 either by hand or in any suitable machine so that an end or marginal portion 16 of the rope-like member 14 lies adjacent to the body of the member 14. The looped portion 15 is then cut or severed from the rope-like member 14 by any suitable means such as that diagrammatically illustrated at 17 in Fig. 3, providing the loop 15 with adjacent end or marginal portions 16 and 18 which may be positioned in a slot 19 of a mold or die 21. It will, of course, be understood that the cutting or severing means 17 may be employed to cut the rope-like member 14 into the desired lengths which may subsequently be bent or formed to provide the loop 15 and the marginal portions 16 and 18 positioned as described above in the slot 19.

The loop or handle member 15 is so positioned in the slot 19 that the ends 16 and 18 project into the mold or die 21 and the loop portion extends outwardly therefrom. The mold or die 21 may, of course, be provided of suitable shape to receive the confection material for a complete lollipop, or sufficient material for only half of the lollipop so that the ends 16 and 18 may be molded between two portions of the confection, the other portion being supplied through a feeder opening or aperture 22 in a mold or die 23 having a slot 24 complementary to the slot 19 in the mold 21. In other words, the solidified edible may be supplied to the complete mold through the aperture 22 after the handle 12 has been positioned in the aperture formed by the slots 19 and 24, or the edible may be formed by supplying the soft confection material to half of the mold, the handle 12 being positioned in the slot 19 thereafter and then the mold 23 positioned on the mold 21 before the remainder of the confection material is supplied through the aperture 22.

It will, of course, be understood that the molds 21 and 23 are merely illustrative of one means of accomplishing this novel result and that the invention contemplates the provision of a plurality of such molds spaced about the periphery of coacting cylinders or drums which may be mechanically driven. Following the forming of the confection as illustrated in Fig. 5, the lollipop is permitted to cool and may subsequently be wrapped and packed in any suitable manner.

The twisted grass or rope-like member 14 when provided as a handle for lollipops has a rough surface or a surface to which the confection securely adheres so that it is very difficult to separate the edible 11 from its handle.

It will be observed, moreover, that such a handle is exceedingly flexible and readily adapted to be bent or flexed to provide a centrally looped handle such as that illustrated in the drawing. This grass is inexpensive and therefore conducive to the provision of an inexpensive edible and being flexible and non-splintering, serves to reduce the objectionable accident hazard so pronounced in prior art edibles of the class described.

Fig. 7 shows the looped handle 12 connected to the edible 11 so that the loop lies in a plane substantially at right angles to the plane of the edible. Such an arrangement of the handle tends to facilitate the handling and provides a loop by means of which the consumer may so hold the lollipop as to minimize the accidental dropping or releasing of the lollipop.

Handles for solidified or shaped edibles when constructed in accordance with the present invention permit the handling of the edible by a consumer without his actually touching or coming into contact with the edible before it is conveyed to his mouth.

These handles, as already mentioned, reduce the hazard of injury due to their flexibility and securely adhere to or in the confection due to their configuration and construction. In addition, these handles are sufficiently strong to provide a support or suspension for the solidified or shaped edibles and are conducive to the production of relatively inexpensive lollipops or "Popsicles."

While I have illustrated a preferred embodiment of my invention, many modifications may be made without departing from the spirit of the invention, and I do not wish to be limited to the precise details of construction set forth, but desire to avail myself of all changes within the scope of the appended claims.

I claim as my invention:

1. A solidified edible of the class which is semi-plastic at temperatures above normal and solid at normal temperatures, in combination with a looped fibrous member having parallel end portions extending into said solidified edible, each said parallel end portion being provided with a twisted surface about which said solidified edible engages.

2. A lollipop comprising a confection adapted to be eaten for food and a rough fibrous member sufficiently rigid to hold up said confection while it is being eaten, but sufficiently flexible to give under compressive forces likely to be applied while said confection is being eaten, whereby to avoid injury to the consumer, said rough fibrous member extending into said confection and constituting a safety handle for holding up the confection while it is being eaten.

3. A lollipop comprising a confection adapted to be eaten for food, and a twisted flexible handle sufficiently rigid to be inserted into said confection and to hold up the same while it is being eaten, said handle having a twisted upper end portion embedded in said confection and having a twisted loop portion for holding up said confection while it is being eaten.

4. A method of making lollipops which comprises arranging the ends of a twisted fibrous member in adjacent parallelism, inserting said ends in a confection while said confection is semi-plastic, and solidifying said confection about said ends by cooling the same to normal temperatures, whereby to provide a looped handle for holding up said confection while it is being eaten.

5. In a confection of the class that is semi-plastic at temperatures above normal, and solid at normal temperatures, a flexible solid fibrous material provided with a looped configuration and having adjacently arranged ends extending into said confection.

6. A solidified edible of the confection class, in combination with a looped member sufficiently rigid to hold up the solidified edible of the confection class for eating, but sufficiently flexible and pliant as to be substantially incapable of injuring the features of a person by an end-on thrust of said member likely to occur during the eating of the said solidified edible of the confection class, said looped member constituting a safety handle for said solidified edible of the confection class.

7. A method of making solidified edibles of the class of confections having handles, which comprises flexing a member sufficiently rigid to support a solidified edible of the confection class in an upright position, but sufficiently flexible and pliant as to be substantially incapable of injuring the features of a person by an end-on thrust of said member, whereby to form a looped configuration and to bring the ends of said member in proximity to each other, inserting said ends of said member into said solidified edible of the confection class, and cooling said solidified edible of the confection class to cause it to adhere to said ends therein.

In witness whereof, I hereunto subscribe my name this 18th day of December, 1930.

CHARLES PARKER.